United States Patent [19]

Bernhardt et al.

[11] Patent Number: 4,711,252

[45] Date of Patent: Dec. 8, 1987

[54] METHOD AND APPARATUS FOR MOUNTING CONCAVES

[75] Inventors: Richard P. Bernhardt, Leola; Robert L. Bowman, Ephrata, both of Pa.

[73] Assignee: New Holland Inc., New Holland, Pa.

[21] Appl. No.: 848,507

[22] Filed: Apr. 7, 1986

[51] Int. Cl.⁴ .............................................. A01F 12/28
[52] U.S. Cl. .................................. 130/27 S; 130/27 L; 130/27 T
[58] Field of Search ................ 130/27 J, 27 JT, 27 K, 130/27 L, 27 P, 27 R, 27 S, 27 T

[56] References Cited

U.S. PATENT DOCUMENTS

| | | | |
|---|---|---|---|
| 3,470,881 | 10/1969 | Knapp et al. | 130/27 T |
| 3,568,682 | 3/1971 | Knapp et al. | 130/27 T |
| 3,631,862 | 1/1972 | Rowland-Hill et al. | 130/27 L |
| 3,696,815 | 10/1972 | Rowland-Hill et al. | 130/27 J |
| 3,871,384 | 3/1975 | Depauw et al. | 130/27 L |
| 3,957,058 | 5/1976 | Komancheck | 130/27 J |
| 4,249,543 | 2/1981 | Rowland-Hill | 130/27 T |
| 4,375,221 | 3/1983 | Bernhardt et al. | 130/27 S |

*Primary Examiner*—Stephen J. Novosad
*Assistant Examiner*—John F. Letchford
*Attorney, Agent, or Firm*—Larry W. Miller; Frank A. Seemar; Darrell F. Marquette

[57] ABSTRACT

A method and apparatus for mounting concaves in an axial flow combine having the threshing and separating rotor extending in a longitudinal direction is disclosed wherein the concaves can be mounted on its adjustable mounting frame through the side of the combine. A pair of longitudinally spaced concave frame members are provided with yokes engageable with longitudinally extending mounting pins affixed to the mounting frame. Support plates carried by the mounting frame can be utilized to support the weight of the concave during the mounting procedure. Retaining links mounted on the mounting pins in conjunction with the concave yokes are connected to the concave frame members to retain the concave on the mounting pins during operation of the combine.

14 Claims, 3 Drawing Figures

METHOD AND APPARATUS FOR MOUNTING CONCAVES

BACKGROUND OF THE INVENTION

The present invention relates generally to axial flow combines and, more particularly, to an improved method and apparatus for mounting concaves on a mounting frame for selective positioning relative to the threshing and separating rotor.

Axial flow combines of the type shown and described in U.S. Pat. No. 4,249,543, issued on Feb. 10, 1981, to E. W. Rowland-Hill currently require a considerable amount of time and effort to remove and install the concaves on its mounting frame proximate to the threshing and separating rotor for cooperable operation therebetween to harvest grain crop fed therebetween. In such combine harvesters, the feeder and feed plate must be removed from the combine before the concave front support can be unbolted and then the concaves removed through the front of the combine. The installation of the concaves involves a reversal of this procedure.

Accordingly, it would be desirable to provide an improved manner in which the concaves could be removed and installed without the need to disturb the infeed mechanism at the front of the combine.

SUMMARY OF THE INVENTION

It is an object of this invention to overcome the aforementioned disadvantages of the prior art by providing a side mount concave mounting apparatus for use in an axial flow combine utilizing a longitudinally extending threshing and separating rotor.

It is another object of this invention to provide an improved method for mounting concaves in an axial flow combine harvester.

It is an advantage of this invention that the utilization of a side mount concave greatly reduces the time and work required to remove and/or install the concave.

It is a feature of this invention that the feeder and feed plate does not need to be removed from the combine in order to install the concave.

It is yet another object of this invention to equip a concave with mounting yokes to be engageable with mounting pins affixed to an adjustable mounting frame to permit the concave to be installed from a transverse direction.

It is still another object of this invention to provide support plates on the adjustable mounting frame to permit the concave to be temporarily rested thereon during the mounting procedure so that the mounting frame will carry the majority of the weight of the concave.

It is another feature of this invention that retaining links can be mounted on the mounting pins and connected to the concave frame members to retain the yokes in the proper position on the mounting pins.

It is another advantage of this invention that adjustable connecting links can be fastened to the concave to permit a rotative adjustment of the concave about an axis coinciding with the mounting pins to position the concave relative to the threshing and separating rotor.

It is a further object of this invention to provide a method and appartus for the mounting of concaves in an axial flow combine having a longitudinally extending threshing and separating rotor which is durable in construction, inexpensive of manufacture, carefree of maintenance, facile in assemblage, and simple and effective in use.

These and other objects, features and advantages are accomplished according to the instant invention by providing a method and apparatus for mounting concaves in an axial flow combine having the threshing and separating rotor extending in a longitudinal direction wherein the concaves can be mounted on its adjustable mounting frame through the side of the combine. A pair of longitudinal spaced concave frame members are provided with yokes engageable with longitudinally extending mounting pins affixed to the mounting frame. Support plates carried by the mounting frame can be utilized to support the weight of the concave during the mounting procedure. Retaining links mounted on the mounting pins in conjunction with the concave yokes are connected to the concave frame members to retain the concave on the mounting pins during operation of the combine.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
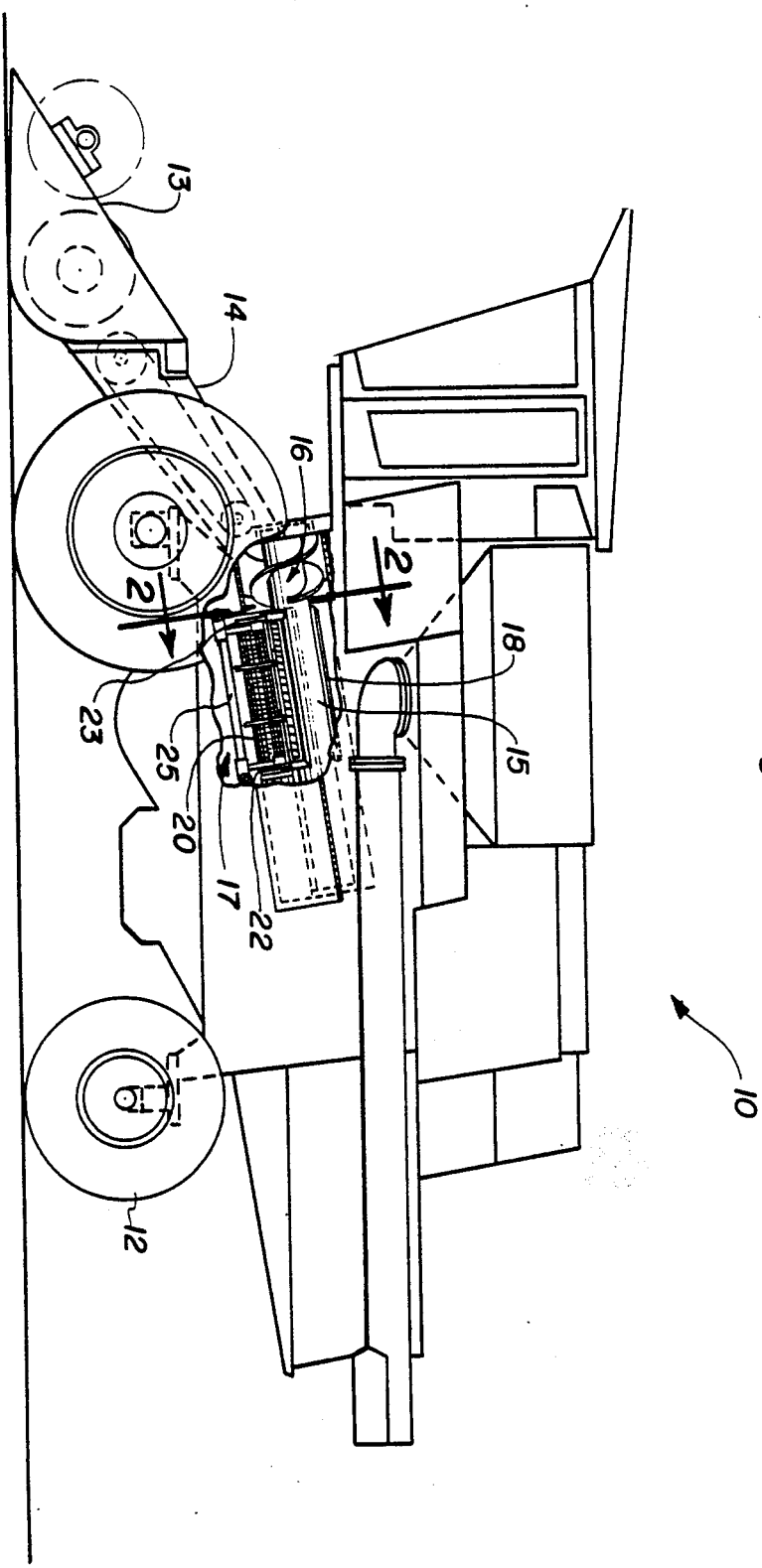
FIG. 1 is a left side elevational view of a combine harvester incorporating the principles of the instant invention, a portion of the side sheet of the combine being broken away to more clearly show the relative positions of the threshing and separating rotors and cooperatively mounted concave.

Referring now to the drawings and, particularly, to FIG. 1, a left side elevational view of a crop harvesting machine, commonly referred to as an axial flow combine harvester, incorporating the principles of the instant invention, can be seen. Any left and right references are used as a matter of convenience and are determined by standing at the rear of the machine, facing the forward end, the direction of travel. The combine 10 is mounted on a wheeled frame 12 to mobilely support the combine 10 over the ground G for the harvesting of crops therefrom. A header 13 is mounted on the forward periphery of the combine 10 to engage and gather crop material from the ground G and consolidate it into a feederhouse structure 14. The feederhouse 14 conveys a flow of crop material into the infeed area 16 of the threshing and separating rotor 15. The flow of crop material then passes into the threshing area 17 between the rotor 15 and the circumferentially mounted concave 20 where grain is threshed and separated from the crop material by rasp bar assemblies 18 cooperating with the concave 20.

Figure 2:
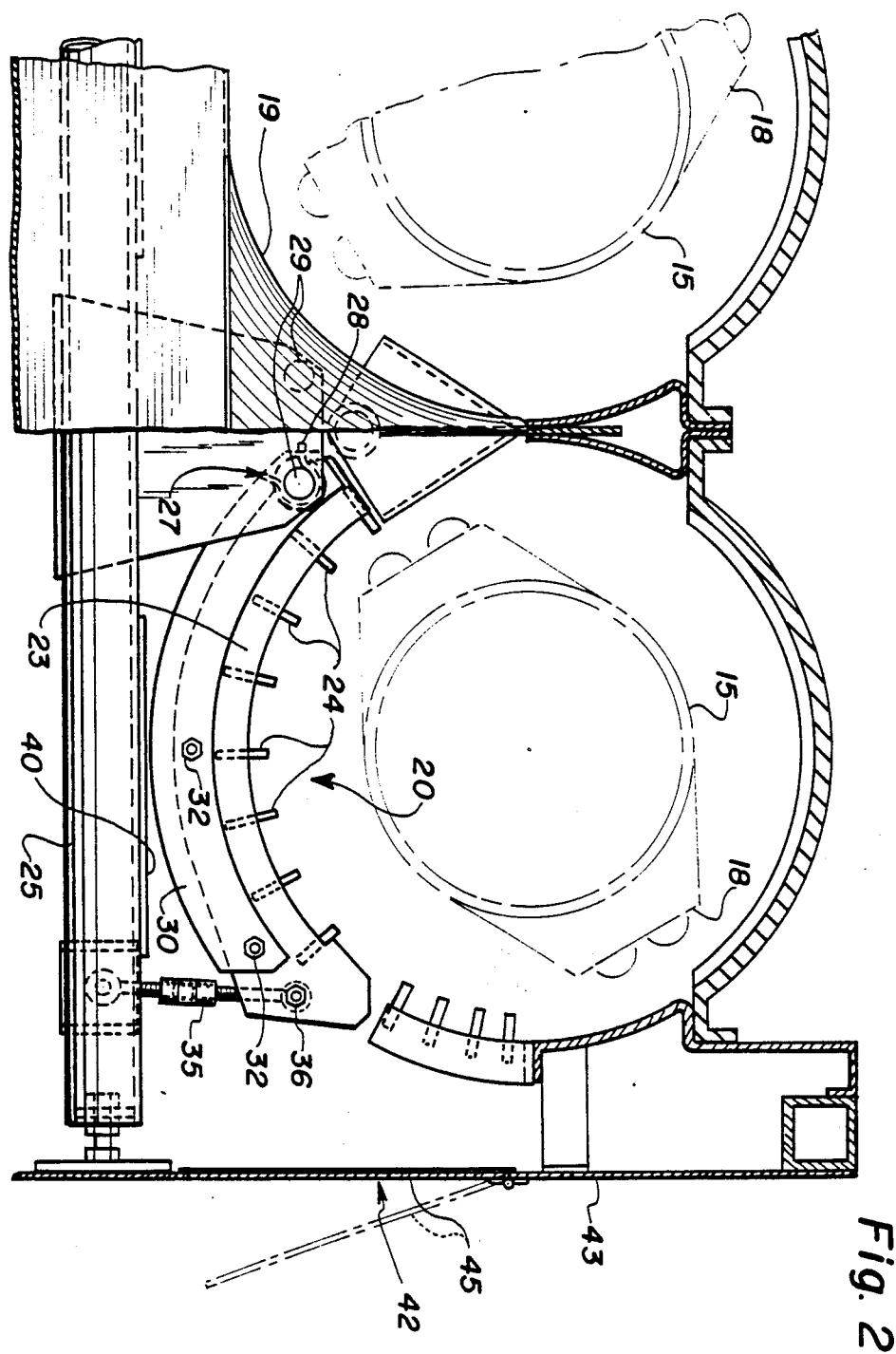
FIG. 2 is an enlarged partial cross-sectional view taken along lines 2—2 of FIG. 1, looking along the longitudinally extending axis of the threshing and separating rotor, the portions of the infeed structure in front of the left hand rotor being broken away to more clearly show the structure and relationships utilized in the side mount concaves forming the instant invention.

Referring now to FIG. 2, the relationship of the rotor 15 and the rasp bar assemblies 18 mounted thereon with respect to the concave 20 can best be seen. The concave 20 is provided with at least two longitudinally spaced frame members 22, the forwardmost of which is designated by the reference numeral 23, which carry a plurality of longitudinally extending rub bars 24 radially positioned relative to the rotor 15. Crop material entering between the rotor 15 and the concave 20 is rubbed between the rasp bar assemblies 18 and the rub bars 24 to separate the grain from the crop material. The concave 20 is mounted on an adjustable mounting frame 25 to permit movement of the concave 20 relative to the rotor 15 as is described in greater detail in U.S. Pat. No. 4,375,221, issued on Mar. 1, 1983, to R. P. Bernhardt et al, the description of which is incorporated herein by reference.

Figure 3:
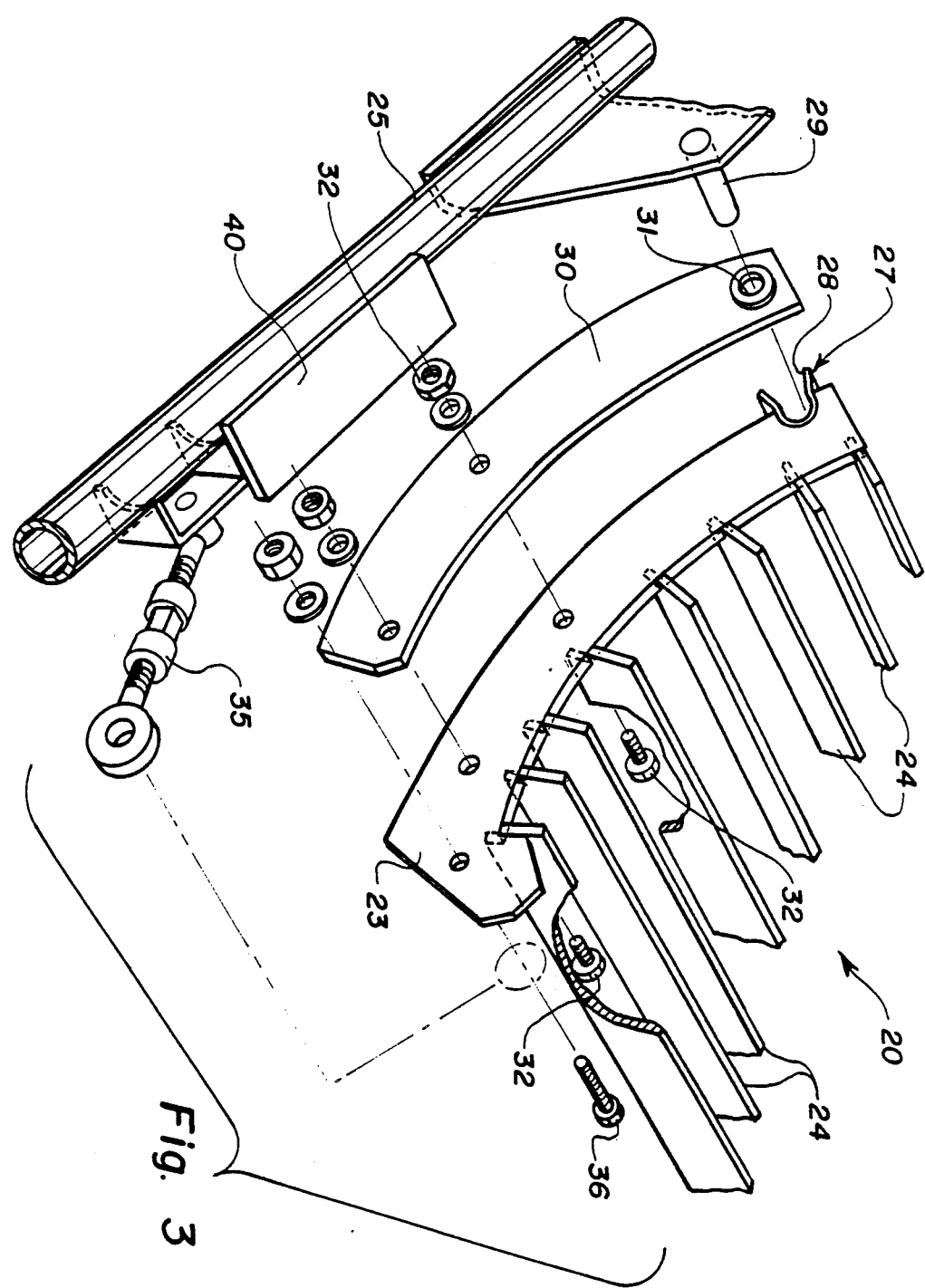
FIG. 3 is an enlarged exploded view of the forwardmost portion of the concave identifying the manner in which the concave and retaining link are mounted on the adjustable mounting frame.

Referring now to FIGS. 2 and 3, the structure of the instant invention can best be seen. Although the forwardmost concave frame member 23 is shown in FIG. 3, the rearwardmost concave frame member 22 is constructed in a similar manner and the structure and operation thereof is equally applicable to the description given below with respect to the forwardmost frame member 23. The frame members 22,23 are provided with a clevis mechanism 27 in the form of open yokes 28 affixed to the frame member 22,23 in a permanent fashion. The yoke 28 is engageable with a mounting pin 29 projecting in a longitudinal direction from the mounting frame 25 and is oriented in such a manner as to be engageable with the mounting pin 29 when the concave 20 is moved in a transverse direction toward the mounting pins 29.

A retaining link 30 is also mountable on the mounting pin 29 and connectable to the concave frame member 22,23 by fasteners 32 such that the retaining link 30 is selectively disconnectable from the corresponding frame member 22,23. The use of the retaining links 30, when connected to the corresponding frame member 22,23, fixes the yoke 28 on the respective mounting pin 29 and prevents the concave 20 from bouncing off the mounting pins 29 during operation of the combine 10. An adjustable connecting link 35 interconnecting the mounting frame 25 and an outboard portion of the frame members 22,23 by a fastener 36 controls the rotative position of the concave 20 about the mounting pin 29. It can be seen that an adjustment of the length of the connecting link 35 will affect a rotation of the yoke 28 about the mounting pin 29 on which it is mounted, thereby changing the relative position of the concave 20 with respect to the rotor 15 in a manner separate from the adjustment of the mounting frame 25.

The mounting frame 25 is provided with a plate member 40 positioned beneath the location of the respective concave frame member 22,23 to carry the weight of the concave 20 during the installation of the concave 20 as will be described in greater detail below. As best seen in FIG. 2, the plate member 20 does not support the weight of the concave 20 after the concave 20 has been mounted on the mounting frame 25, the respective concave frame member 22,23 being spaced above the plate member 40 to permit a rotative movement thereof about the mounting of the yoke 28 on the mounting pins 29 through an adjustment of the connecting link 35.

Using the component parts of the concave and mounting structures as described above, the method of installing the side mount concaves 20 is described below with particular reference being made to FIGS. 2 and 3.

To install the concave 20 on the mounting frame 25, access to the interior of the combine 10 can be gained through the access opening 42 opposite the mounting location of the combine 20 in the side sheet 43 of the combine 10 covered by the hinged door 45. The retaining links 30 are first mounted on the mounting pins 29 by positioning the retaining links 30 such that the mounting pins are inserted through the bore 31. The concave 20 is then inserted through the access opening 42 and, using the plates 40 to temporarily support the weight of the concave 20, the frame members 22,23 are positioned so that the yokes 28 can be guided onto the mounting pins 29.

The fasteners 32 are then inserted through the respective frame members 22,23 and the corresponding retaining links 30 to fix the retaining links 30 to the concave frame members 22,23. The adjustable connecting links 35 are then connected to the respective concave frame members 22,23 by the fasteners 36. Any fine adjustments required of the concave to position it relative to the threshing and separating rotor 15 can be obtained by adjusting the relative lengths of the connecting links 35. As seen in FIG. 2, once the concave 20 is supported on the mounting pins 29 and the connecting links 35, the respective frame members 22,23 are lifted off the plate members 40.

One skilled in the art will readily realize that the purpose of the retaining links 30 is to resist forces imposed on the concaves 20 to prevent the yokes 28 from becoming disengaged from the mounting pins 29 during normal harvesting operation of the combine 10. The retaining links 30 can be unbolted from the concave frame members 22,23 to permit an easy removal of the concaves 20 through the transversely positioned openings 42 in the side sheet 43 of the combine 10. This structure eliminates the need to remove the infeed mechanism 19 located at the forward portion of the rotor 15 in order to install the concaves 20. Removal of the concaves 20, such as needed for changing the concaves 20, can be accomplished in the reverse manner indicated above for installation of the concaves 20. The connecting links 35 can be disconnected from the concave frame members 22,23 and the concave 20 rested upon the plate members 40. A disconnection of the retaining links 30 from the frame members 22,23 will permit the yokes 28 to be disengaged from the mounting pins 29 and the concave 20 to be removed through the opening 42 in the side sheet 43.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention however, concepts, as based upon the description may be employed in other embodiments without departing from the scope of the invention. Accordingly, the following claims are intended to protect the invention broadly, as well as in the specific form shown.

Having thus described the invention, what is claimed is:

1. In an axial flow combine harvester having a mobile frame supporting a pair of transversely spaced side sheet and a threshing and separating rotor supported by said frame and extending in a generally longitudinally extending direction, said rotor being cooperable with a concave peripherally positioned relative to said rotor and having transversely extending, longitudinally spaced concave frame members supporting longitudinally extending rub bars cooperable with said rotor to harvest grain from crop material fed between said rotor and said concave, said concave being adjustably supported on a mounting frame to permit movement of said concave relative to said rotor, the improvement comprising:

said concave being provided with clevis means to permit engagement thereof from a transverse direction with longitudinally extending mounting pins supported by said mounting frame to permit the mounting of said concave on said mounting frame from an access opening in one of said side sheets transversely opposite said mounting pins, said concave being detachably fastened to said mounting frame by connecting links at locations spaced from said mounting pins and said concave further includes linkage means detachably connected to said concave frame members and associated with said clevis means to positionally retain said clevis means on said mounting pins during operation of said combine harvester.

2. The combine harvester of claime 1, further comprising plate means supported by said mobile frame adjacent said concave frame members to provide temporary support of said concave during the mounting of said clevis means on said mounting pins.

3. The combine harvester of claim 2 wherein said clevis means includes a pair of longitudinally spaced yokes mounted on corresponding concave frame members to be engaged with corresponding mounting pins.

4. The combine harvester of claim 3 wherein said linkage means comprises a pair of retaining links mountable on the respective said mounting pins and detachably connectable to the concave frame members carrying said yokes to positionally retain said yokes on said mounting pins.

5. The combine harvester of claim 4 wherein said plate means includes a pair of plate members supported by said mounting frame beneath the concave frame members carrying said yokes.

6. The combine harvester of claim 5 wherein said connecting links connecting said mounting frame to the concave frame members carrying said yokes are adjustable to effect rotative movement of said concave about said mounting pins and, thereby, permit selective adjustment of said concave relative to said rotor.

7. A concave too use in an axial flow combine harvester in cooperative association with a longitudinally extending threshing and separating cylinder to harvest grain from crop material fed therebetween, said concave being adjustably supported on a mounting frame to permit selective movement of said concave relative to said rotor comprising:

a pair of concave frame members supporting a plurality of longitudinally extending rub bars;

a yoke mounted on each of said concave frame members for engagement with corresponding mounting pins affixed to said mounting frame, said yokes being positioned such that engagement thereof with said mounting pins can be affected when said concave is moved in a transverse direction;

a pair of retaining links detachably connectable with respect to said concave frame members and mountable on said mounting pins to prevent said yokes from becoming disengaged with said mounting pins while said retaining links are connected to said concave frame members; and connecting links detachably interconnecting said concave frame members and said mounting frame at a location spaced from said mounting pins to fix the position of said concave relative to said mounting frame.

8. The concave of claim 7 wherein said mounting frame includes plates mounted thereon adjacent said concave frame members to temporarily support said concave during the transverse movement thereof to effect engagement between said yokes and said mounting pins.

9. The concave of claim 8 wherein said connecting links are adjustable to change the length thereof and cause a rotative motion of said concave about said mounting pins to positionally adjust said concave relative to said rotor.

10. A method of installing a concave on an axial flow combine said concave being mountable on a mounting frame carrying a pair of longitudinally extending mounting pins for supporting a concave in cooperative association with a threshing and separating rotor to harvest grain from crop material fed between said rotor and said concave comprising the steps of:

moving said concave in a transverse direction toward said mounting pins to affect engagement of a yoke mounted on a concave frame member corresponding to each said mounting pin, each said yoke being rotatably movable on the corresponding said mounting pin to permit movement of said concave relative to said rotor;

fixing a retaining link to each respective concave frame member to fix each said yoke to the corresponding said mounting pin; and connecting a connecting link pivotably attached to said mounting frame to each said concave frame member to support said concave from said mounting frame and control the rotative movement of said yokes about said mounting pins.

11. The method of claim 10 wherein said moving step includes the step of:

resting said concave on plate members positioned on said mounting frame to support a portion of the weight of said concave during said moving step.

12. The method of claim 11 wherein said connecting step includes the steps of:

lifting said concave above said plate members; and
selecting the length of said connecting link to select a desired rotated position of said concave about said mounting pins and, thereby, selectively positioned said concave relative to said rotor.

13. The method of claim 12 wherein said fixing step includes the steps of:

mounting said retaining link on each respective said mounting pin, said retaining links being positionable on said mounting pins only along the axis thereof; and fastening said retaining links to the corresponding said concave frame members.

14. The method of claim 13 wherein said moving step further includes the step of:

inserting said concave through an opening in a side sheet of said combine, said opening being closeable by a door.

* * * * *